United States Patent
Oyama (10) Patent No.: US 7,021,924 B2
(45) Date of Patent: Apr. 4, 2006

(54) INJECTION COMPRESSION MOLDING APPARATUS AND INJECTION COMPRESSION MOLDING METHOD

(75) Inventor: Yosuke Oyama, Aichi-ken (JP)

(73) Assignee: Kabushiki Kaisha Meiki Seisakusho, Aichi-ken (JP)

(*) Notice: Subject to any disclaimer, the term of this patent is extended or adjusted under 35 U.S.C. 154(b) by 331 days.

(21) Appl. No.: 10/377,719

(22) Filed: Mar. 4, 2003

(65) Prior Publication Data
US 2003/0168779 A1 Sep. 11, 2003

(30) Foreign Application Priority Data
Mar. 5, 2002 (JP) .............................. 2002-058128
Feb. 4, 2003 (JP) .............................. 2003-026808

(51) Int. Cl.
*B29C 45/18* (2006.01)

(52) U.S. Cl. ................. 425/571; 264/328.7; 425/574

(58) Field of Classification Search ................ 425/190, 425/571, 574, 171; 264/328.7
See application file for complete search history.

(56) References Cited

U.S. PATENT DOCUMENTS 5,348,464 A * 9/1994 Rogers ....................... 425/574
5,536,159 A * 7/1996 Yamamura et al. ......... 425/150

FOREIGN PATENT DOCUMENTS

JP 7-96238 10/1997

* cited by examiner

*Primary Examiner*—Tim Heitbrink
(74) *Attorney, Agent, or Firm*—Browdy and Neimark, PLLC (57) ABSTRACT

In an injection compression molding apparatus and an injection compression method according to the present invention, the structure of the dies can be simplified and a loss of resin as well as of heat due to solidification of the resin in the path at the time of molding can be eliminated. Further, injection pressure loss can be reduced when melted resin is injected into a cavity. A resin injection hole in a nozzle that is attached to an injection device is connected at a position between a stationary die and a movable die directly to the cavity that has a larger volume than a volume of a molded product by means of the movable die, melted resin is injected into said cavity directly from said resin injection hole by said injection device, then the movable die is moved, in the die closing direction, to reduce the distance of the connection between said resin injection hole and said cavity by means of a side wall of the movable die, and to reduce the volume of the cavity so as to compress said melted resin.

5 Claims, 5 Drawing Sheets

FIG. 5

INJECTION COMPRESSION MOLDING APPARATUS AND INJECTION COMPRESSION MOLDING METHOD

BACKGROUND OF THE INVENTION

1. Field of the Invention

The present invention relates to an injection compression molding apparatus, an injection compression molding die, and an injection compression molding method wherein melted resin is injected, into a cavity that is formed by a stationary die and a movable die, from a nozzle attached to an injection apparatus and, then, the volume of the cavity is reduced, to compress the melted resin in the cavity, by moving the movable die toward the stationary die.

In the present invention, the injection compression molding includes both a so-called injection compression molding that moves the movable die in the die opening direction by injecting the melted resin into the cavity and then moves the movable die in the die closing direction again to compress the melted resin in the cavity, and a so-called injection press molding that injects the melted resin into the cavity while the movable die is stopped at a predetermined open position in advance and then moves the movable die in the die closing direction.

2. Description of the Related Art

Conventionally, an injection compression molding apparatus such as that described in patent document 1 is well-known. According to the description in the above publication, a nozzle abuts on a resin injection hole provided on a lower die that is a stationary die, and melted resin is injected from the nozzle into a cavity through a resin path, a resin reservoir and the like. Then, after the melted resin is injected into the cavity, in order to complete the molding process, an upper die that is a movable die is moved toward the lower die so that the melted resin in the cavity is compressed and the resin in the path is solidified for gate cutting.

[Patent Document 1]
Japanese Examined Patent Publication (Kokoku) Hei 7-96238 (pp. 2–7)

However, in the injection compression apparatus described above, as the resin path, the reservoir and the like are formed between the resin injection hole provided on the bottom surface of the lower die and the cavity, there are problems in that:

(1) the construction of the dies is complicated and it is costly to manufacture the dies;
(2) since the resin is solidified in said path, reservoir and the like at the time of molding, loss of the resin as well as heat loss may occur in every molding process, which will result in poor energy efficiency;
(3) a device for taking out the resin that is solidified in the path, reservoir and the like at the time of molding is needed, or a device for cutting off the molded products from the resin that is solidified in the path, reservoir and the like is needed; and
(4) the melted resin that passes through a complicated pathway to reach the cavity may suffer pressure loss.

SUMMARY OF THE INVENTION

In view of the above problems, it is an object of the present invention to simplify the construction of dies and prevent loss of resin and heat due to solidification of the resin in a path at the time of molding in injection compression molding. Further, it is another object of the present invention to reduce injection pressure loss when melted resin is injected into a cavity.

According to a first aspect of the present invention, there is provided an injection compression molding apparatus comprising: a movable die having a movable-side cavity forming surface; a stationary die having a stationary-side cavity forming surface that is opposite to the movable-side cavity forming surface, and a nozzle abutting surface that is spaced from both a side edge portion of the movable-side cavity forming surface and a side edge portion of the stationary-side cavity forming surface by predetermined distances and is formed at the side of an injection device; and a nozzle having a resin injection hole that can be connected to the cavity directly at a position between the side edge portions of the stationary-side cavity forming surface and the movable-side cavity forming surface, a nozzle tip surface that is adjacent to the resin injection hole, and a die abutting surface that is disposed outside the nozzle nearer to the injection device than the nozzle tip surface and that can abut on the nozzle abutting surface of the stationary die, wherein melted resin is injected into the cavity directly from the resin injection hole of the nozzle and then the movable die is moved toward the stationary die to compress the melted resin.

According to a second aspect of the present invention, the injection compression molding apparatus according to the first aspect further comprises: a nozzle insertion hole that is formed in a penetrating manner toward the cavity forming surface of the stationary die on an outer wall portion of the stationary die through which a core portion of the movable die is inserted so that it can be movable in the die opening/closing direction; and a nozzle abutting surface disposed in the vicinity of the nozzle insertion hole at the side of the injection device or inside the nozzle insertion hole.

According to a third aspect of the present invention, in the injection compression molding apparatus according to the first or second aspect, an opening of the resin injection hole formed on the nozzle tip surface is configured so that a dimension in the direction parallel to the side edge portion of the stationary-side cavity forming surface is longer than another dimension in the direction orthogonal to the side edge portion.

Further, according to a first aspect of the present invention, there is provided an injection compression molding die, comprising: a stationary die having an outer wall portion formed around a stationary-side cavity forming surface, a nozzle insertion hole formed through the outer wall portion toward the stationary-side cavity forming surface, and a nozzle abutting surface on which the nozzle abuts and which is formed at an adjacent portion of the nozzle insertion hole at the side of the injection device or inside the nozzle insertion hole; and a movable die on which a movable-side cavity forming surface is formed and which has a core portion that is inserted within the outer wall portion of said stationary die to form a cavity with variable volume, wherein melted resin can be injected from a resin injection hole in the nozzle abutting on said nozzle abutting surface to the cavity directly not through a sprue and injected melted resin can be compressed.

According to a first embodiment of the present invention, there is provided an injection compression molding method comprising the steps of: connecting a resin injection hole of a nozzle, which is in turn attached to an injection device, at a position between a stationary die and a movable die directly to a cavity that holds a volume larger than a volume of a molded product by means of the movable die; injecting melted resin into the cavity from the resin injection hole by the injection device directly; then moving the movable die in the die closing direction; and reducing the length of the connection between the resin injection hole and the cavity by means of a side wall of the movable die so as to reduce the volume of the cavity and compress said melted resin.

According to a second aspect of the present invention, in the injection compression molding method according to the first aspect, at least a portion of nozzle touch force is received on a nozzle facing surface on the wall of the stationary die that is adjacent to the cavity and on a surface other than the side wall of the movable die.

According to a third aspect of the present invention, in the injection compression molding method according to the first or second aspect, an opening of the resin injection hole in the nozzle is configured so that a dimension in the direction parallel to a side edge portion of a stationary-side cavity forming surface is longer than another dimension in the direction orthogonal to the side edge portion.

According to a third aspect of the present invention, in the injection compression molding method according to the first and second aspects, the injection compression molding apparatus according to said second aspect is used and a nozzle position guide means is attached to the nozzle insertion hole of the stationary die so that the molding process is performed after positioning the nozzle with respect to the stationary die.

DETAILED DESCRIPTION OF THE PREFERRED EMBODIMENTS

Figure 1:
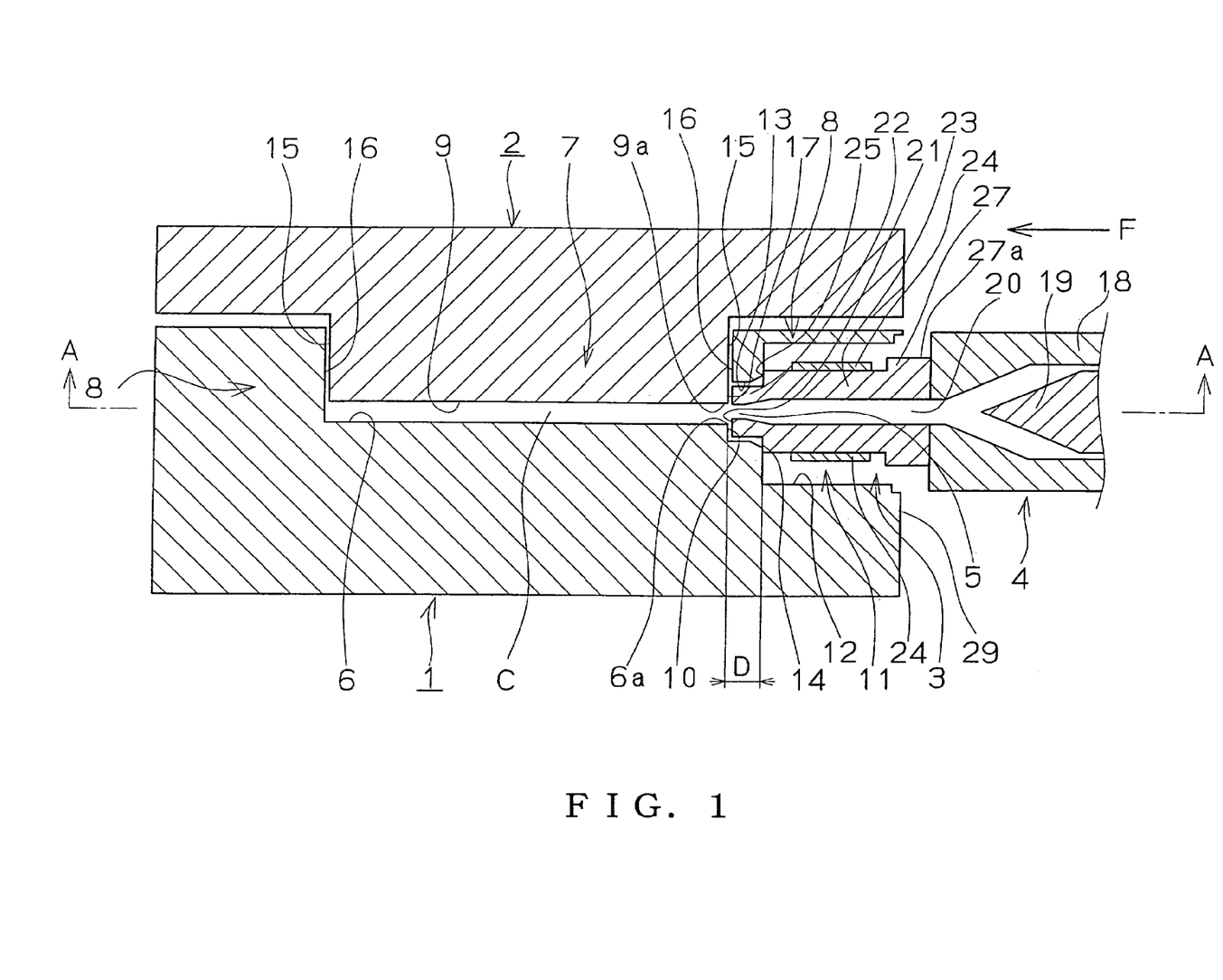
FIG. 1 is a cross-sectional view of an injection compression molding apparatus according to the present invention.
Figure 2:
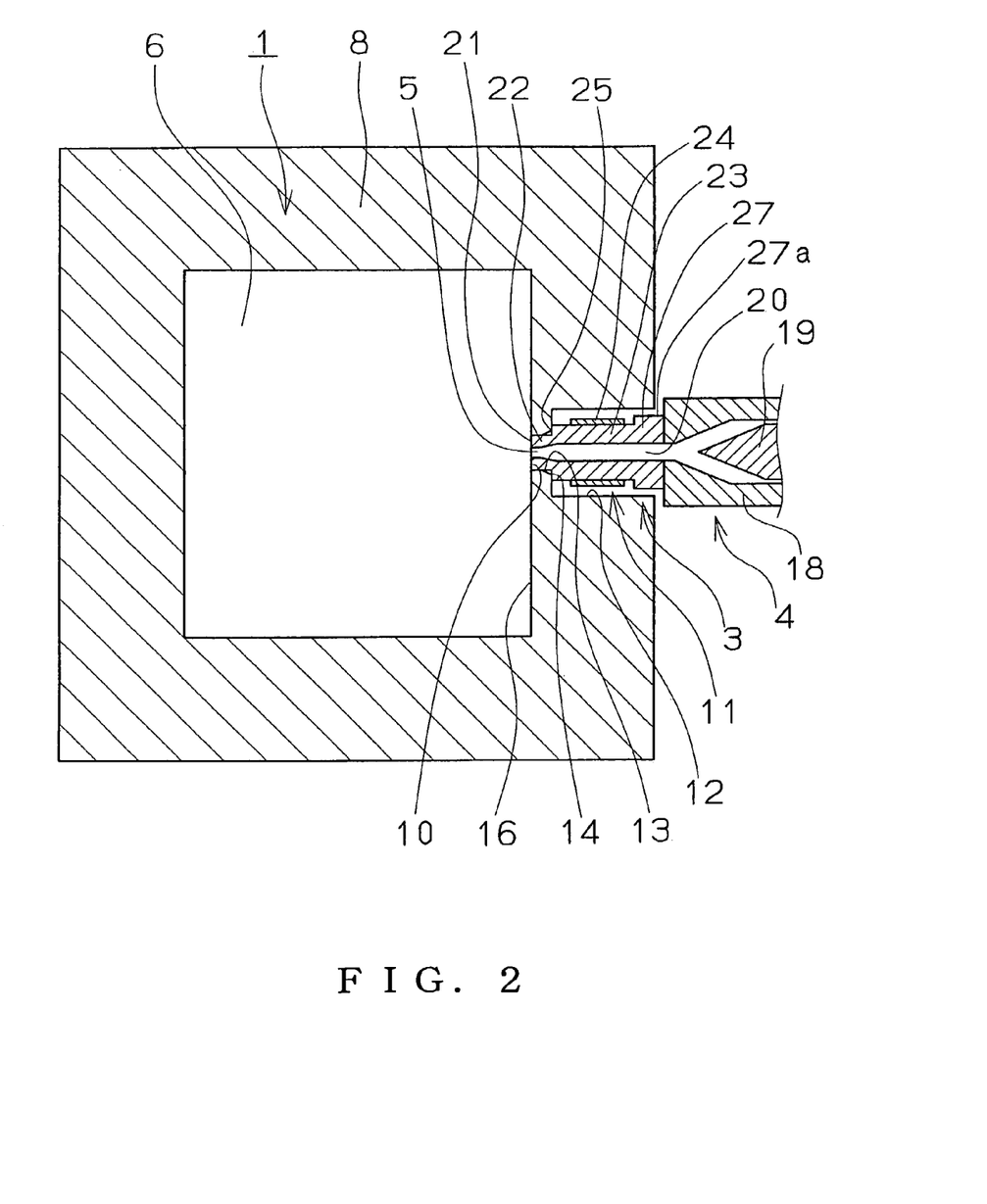
FIG. 2 is a cross-sectional view taken on line A—A of FIG. 1.
Figure 3:
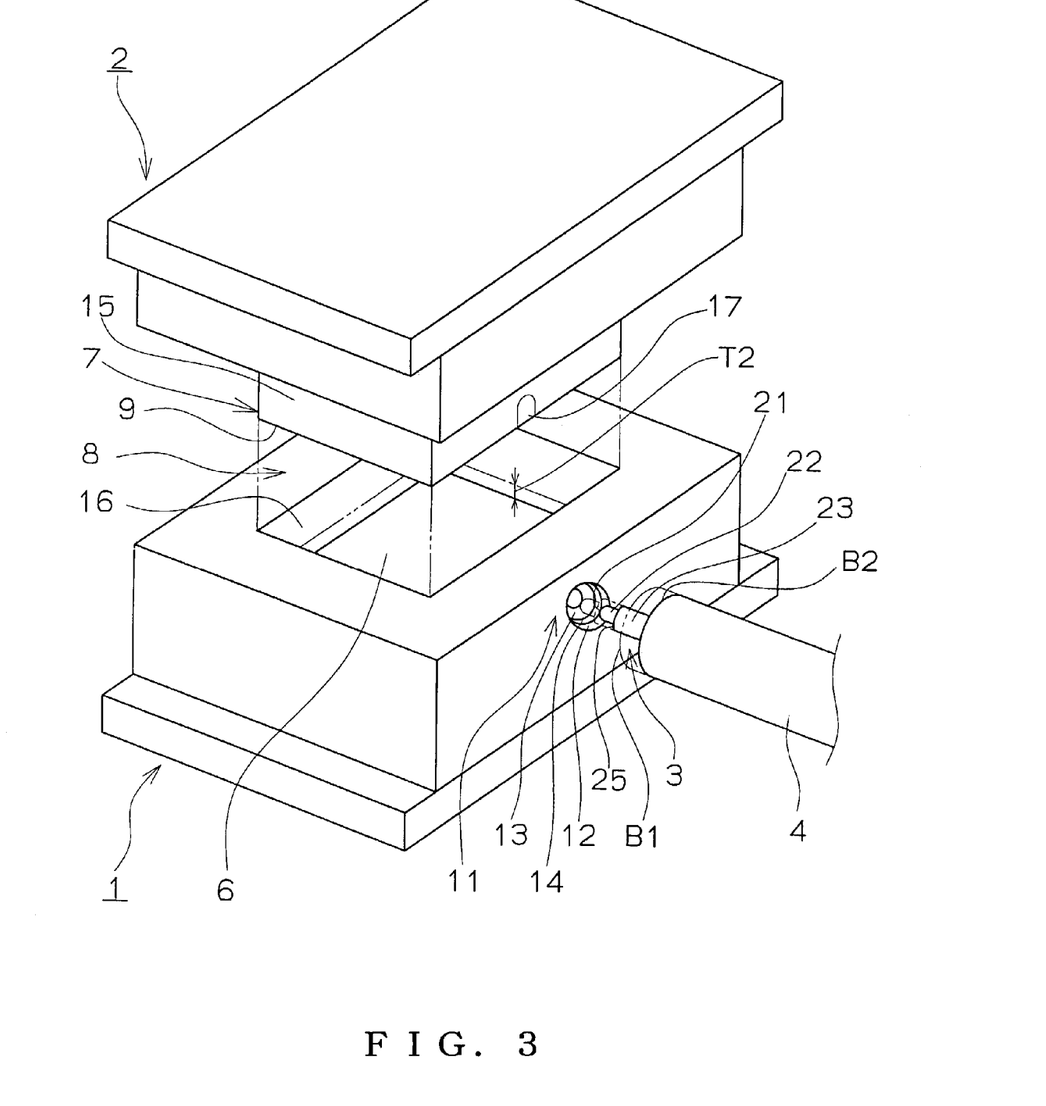
FIG. 3 is a perspective view showing a state in which a movable die is moved to the open position in the injection compression molding apparatus according to the present invention.
Figure 4:
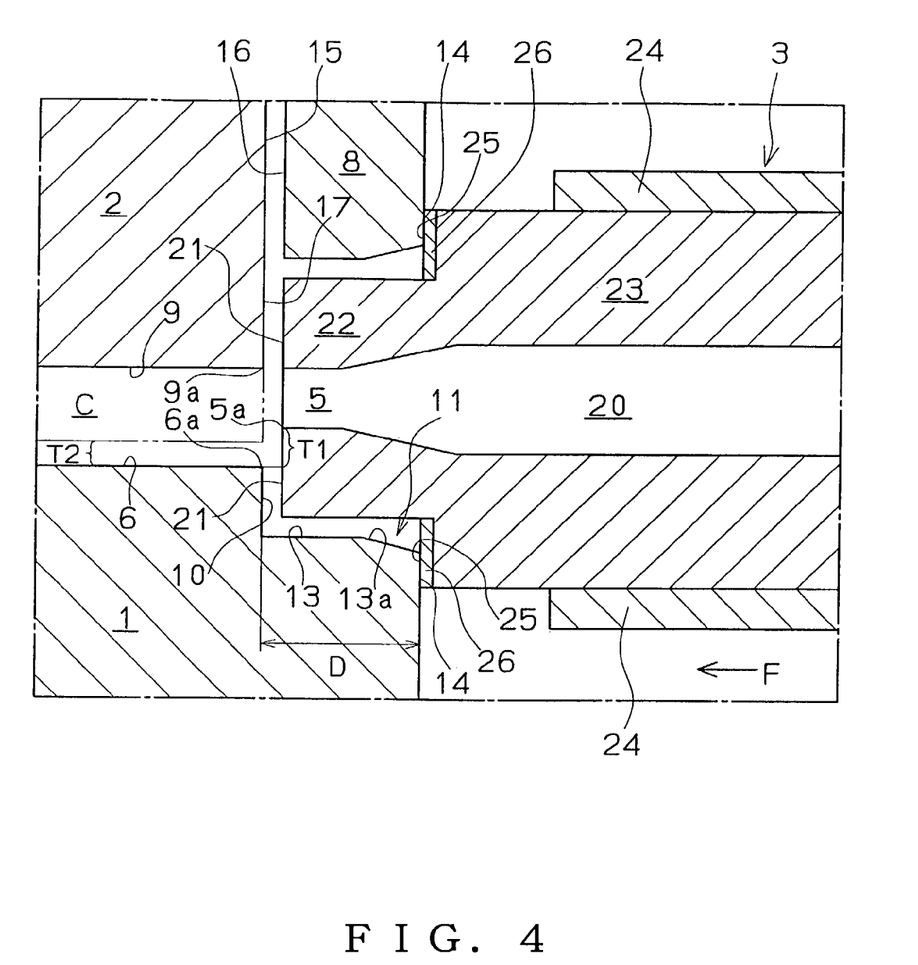
FIG. 4 is an operation-explanatory drawing of the injection compression molding apparatus according to the present invention.
Figure 5:
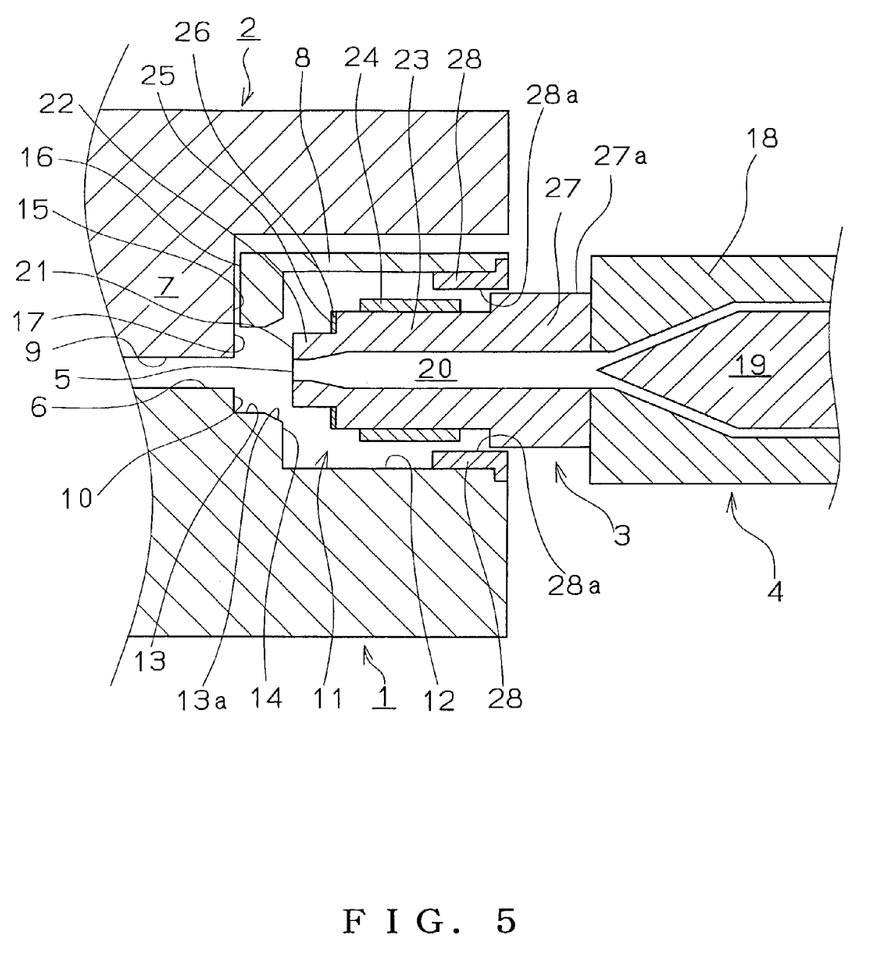
FIG. 5 is an explanatory drawing for describing nozzle positioning in an injection compression molding method according to the present invention.

Hereinafter, the present invention will be described with reference to FIGS. 1–5. FIG. 1 is a cross-sectional view of an injection compression molding apparatus according to the present invention. FIG. 2 is a cross-sectional view taken on line A—A of FIG. 1. FIG. 3 is a perspective view showing a state in which a movable die is moved to the open position in the injection compression molding apparatus according to the present invention. FIG. 4 is an operation-explanatory drawing of the injection compression molding apparatus according to the present invention. FIG. 5 is an explanatory drawing for describing nozzle positioning in an injection compression molding method according to the present invention.

First, an injection compression molding apparatus according to the present invention will be schematically described with reference to FIGS. 1–4, wherein a stationary die 1, that is a lower die, is secured to a stationary platen at one side on a bed (not shown). Opposed to said stationary die 1, a movable die 2, that is an upper die, is attached to a movable platen (not shown) so that it can be movable toward the stationary die 1 with the aid of a die opening/closing device (not shown). Then, melted resin that is injected into a cavity C formed by the stationary die 1 and the movable die 2 can be compressed when the movable die is moved in the die closing direction by a die clamping device (not shown). On the other hand, an injection device 4 is disposed at the other side of the bed so that it can be moved to and fro between a nozzle abutting position B1 and a retreating position B2, wherein a nozzle 3 is attached to the injection device 4. Further, a resin injection hole 5 of said nozzle 3 can be connected directly to the cavity C at a position between the stationary die 1 and the movable die 2.

Next, each of the elements will be described more specifically. As shown in FIGS. 1 and 3, the stationary die 1 has a concave shape, wherein a stationary-side cavity forming surface 6 is formed on a surface opposed to the movable die 2, and an outer wall portion 8 is formed around said stationary-side cavity forming surface 6 wherein a core portion 7 of the movable die 2, which will be described later, can be inserted into the outer wall portion 8. Then, in the center of the outer wall portion 8 at the side of the injection device 4, a nozzle insertion hole 11 is formed in a penetrating manner through the outer wall portion 8 toward said stationary-side cavity forming surface 6. More specifically, the nozzle insertion hole 11 is formed so that a side edge portion 6a of the stationary-side cavity forming surface 6 is disposed downward relative to the center of said nozzle insertion hole 11, wherein a nozzle facing surface 10 that downwardly extends from the side edge portion 6a is formed in the direction vertical to the stationary-side cavity forming surface 6. Therefore, when viewed from the side of the injection device 4, said nozzle facing surface 10 has a semicircular shape the lower side of which follows the shape of the lower side of the nozzle 3. Further, in the axis direction of the nozzle 3, the nozzle facing surface 10 is disposed at a position slightly farther from the injection device 4 than an inner side wall 16 of the outer wall portion 8.

The nozzle insertion hole 11 is provided so that the nozzle 3 is inserted therethrough when the melted resin is injected into the cavity C and the resin injection hole 5 of the nozzle 3 can be connected to the cavity C directly. As shown in FIGS. 1 and 2, the interior of the nozzle insertion hole 11 is divided into a larger-diameter portion 12 and a smaller-diameter portion 13, and a nozzle abutting surface 14 is formed on a vertical surface at the step between the larger-diameter portion 12 and the smaller-diameter portion 13. When the nozzle 3 is positioned at the nozzle abutting position B1, said nozzle abutting surface 14 abuts a die abutting surface 25 of the nozzle 3 described later. Further, as apparent from FIGS. 1 and 2, said nozzle abutting surface 14 is formed at the side of the injection device 4 spaced by a predetermined distance D from the side edge portion 6a of the stationary-side cavity forming surface 6 and the nozzle facing surface 10 in the stationary die 1. Then, as shown in FIG. 4, the diameter of the smaller-diameter portion 13 of the nozzle insertion hole 11 is defined so that a tip portion 22 of the nozzle 3 can be inserted therethrough with a slight clearance to prevent leakage of the resin when the melted resin is injected from the nozzle 3. In this embodiment, in order to prevent galling when the tip portion 22 of the nozzle 3 is inserted, a tapered surface 13a the diameter of which is increased in the direction to the injection device 4 is formed at the side of the injection device 4 of the smaller-diameter portion 13. Further, the larger-diameter portion 12 of the nozzle insertion hole 11 has a larger diameter than a main body portion 23 of the nozzle 3 described later so as to avoid heat conduction from the nozzle 3.

Though the interior of the nozzle insertion hole 11 is divided into the larger-diameter portion 12 and the smaller-diameter portion 13 and the nozzle abutting surface 14 is formed at the step between the larger-diameter portion 12 and the smaller-diameter portion 13 in this embodiment, the nozzle insertion hole 11 may be configured to have a uniform inside diameter without a step and the nozzle abutting surface 14 may be formed on an adjacent portion 29 at the side of the injection device in the side wall surface of the outer wall portion 8 in the vicinity of the nozzle insertion hole 11. Further, the position of the nozzle insertion hole 11 is not limited to the center of the stationary die 1 and it may be disposed at a position inclined to either side.

The movable die 2 has a convex shape and has the core portion 7, where a movable-side cavity forming surface 9 is formed on a surface opposed to the stationary-side cavity forming surface 6 of the stationary die 1. Then, a side wall 15 of the core portion 7 is formed with a slight clearance from the inner side wall 16 of the outer wall portion 8 of said stationary die 1, to avoid galling, and said core portion 7 is inserted so that it can be movable in the die opening/closing direction in the outer wall portion 8 of the stationary die 1 and the volume of the cavity C can be varied. Then, the movable-side cavity forming surface 9 is configured so that its side edge portion 9a is disposed in vertical line with the side edge portion 6a of the stationary-side cavity forming surface 6. Then, the resin injection hole 5 of the nozzle 3 is disposed between a (center) part of the side edge portion 6a of said stationary-side cavity forming surface 6 and a (center) part of the side edge portion 9a of the movable-side cavity forming surface 9 so that the resin injection hole 5 can be connected to the cavity C and the melted resin can be injected directly into the cavity C from said resin injection hole 5. For such purpose, a nozzle facing surface 17 is formed on the side wall 15 that is adjacent to the part of the side edge portion 9a of the movable-side cavity forming surface 9. Said nozzle facing surface 17 is formed in vertical line with the nozzle facing surface 10 on the stationary die 1 and spaced from the nozzle abutting surface 14 by the predetermined distance D at the side of the cavity C (at the opposite side of the injection device 4). Further, as shown in FIG. 4, the nozzle forming surface 17 is disposed, with a slight clearance, away from a nozzle tip surface 21 of the nozzle 3 described later so that leakage of the melted resin does not occur. Thus, as the movable die 2 is moved in the die closing direction, the nozzle facing surface 17 that is a portion of the side wall 15 of the movable die 2 can be movable without occurrence of galling so that the connection between the resin injection hole 5 of the nozzle 3 and the cavity C can be reduced.

Further, in the present invention, as the heated nozzle 3 is connected to the side edge portion 6a of the stationary-side cavity forming surface 6 and the side edge portion 9a of the movable-side cavity forming surface 9 directly, temperature control devices (not shown) are provided around the nozzle insertion hole 11 of the outer wall portion 8 and in the vicinity of the side edge portion 6a of the stationary-side cavity forming surface 6 and the side edge portion 9a of the movable-side cavity forming surface 9 for equalizing temperature distribution in the entire dies.

Next, the injection device 4 and the nozzle 3 will be described with reference to FIGS. 1–4. In the injection device 4 according to the present invention, a screw 19 is provided in a cylinder 18 that has a heating means (not shown) so that the melted resin is measured and injected with the aid of rotation and to and fro movement of said screw 19. Then, as shown in FIG. 4, the injection device 4 is configured so that it can be moved to and fro by a moving means (not shown) between the nozzle abutting position B1 in which the resin injection hole 5 of the nozzle 3 is connected to the cavity C formed by the stationary die 1 and the movable die 2 and the retreating position B2. Here, the injection device 4 is guided by a linear guide to improve accuracy of the nozzle touch position. Then, as shown in FIG. 1, the nozzle 3 is pressed against the stationary die 1 with nozzle touch force F by the moving means of the injection device 4 at the nozzle abutting position B1. Here, it is to be noted that the type, arrangement, quantity and the like of the injection device 4 is not limited to any particular embodiment, and the moving means of the injection device 4 may be configured so that the nozzle 3 always abuts on the die.

The nozzle 3 is attached to the injection device 4 and a resin passage 20 is formed along the center axis of the nozzle 3 from inside of the injection device 4. In the nozzle 3, the resin injection hole 5 is formed at the tip side to communicate with said resin passage 20, and on the outer surface adjacent to said resin injection hole 5, the nozzle tip surface 21 is formed in the vertical direction parallel to the nozzle facing surface 10 of the stationary die 1 and the nozzle facing surface 17 of the movable die 2.

Further, as shown in FIG. 4, the nozzle 3 is comprised of the smaller-diameter tip portion 22 having the nozzle tip surface 21 and the main body portion 23 that is disposed at the side of the injection device 4 and has a larger diameter than said tip portion 22, wherein the tip portion 22 can be inserted into the smaller-diameter portion 13 of said nozzle insertion hole 11 with a slight clearance to prevent leakage of the resin. Further, the main body portion 23, to which a heater 24 acting as a heating means is attached, can be inserted into the larger-diameter portion 12 of the nozzle insertion hole 11 with a constant clearance. Then, a flange portion 27 is formed at the side of the injection device 4 of the main body portion 23. The plane of this flange portion 27 is used for positioning the nozzle 3 with respect to the stationary die 1 as described later.

Then, at the boundary between the tip portion 22 of a nozzle outer surface and the main body portion 23, the die abutting surface 25 is formed in the vertical direction parallel to the nozzle abutting surface 14 formed on the outer wall portion 8 of said stationary die 1. Then, in the axis direction of the nozzle 3, the length between the nozzle tip surface 21 and the die abutting surface 25 of the nozzle 3 is shorter than the predetermined distance D between the nozzle facing surface 10 of the stationary die 1 or the nozzle facing surface 17 of the movable die 2 and the nozzle abutting surface 14 of the stationary die 1 by a slight distance so that the leakage of the melted resin does not occur. This allows said nozzle touch force F to be received at the interface between the nozzle abutting surface 14 and the die abutting surface 25 when the melted resin is injected into the cavity C. At the same time, a slight clearance is formed between the nozzle tip surface 21 and the nozzle facing surface 10 of the stationary die 1 or the nozzle facing surface 17 of the movable die 2 as shown in FIG. 4 so that the leakage of the melted resin does not occur.

Here, in this embodiment, as shown in FIG. 4, an appropriate number of shims 26 (sheet metals) are attached on the die abutting surface 25 of the nozzle 3 as a nozzle position adjusting means so that the clearance between the nozzle tip surface 21 and the nozzle facing surfaces 10 and 17 at the time of nozzle abutment is adjusted to about 10–30 μm to prevent leakage of the melted resin.

Here, the nozzle position adjusting means may be configured so that the shims 26 are attached on the nozzle abutting surface 14 of the nozzle insertion hole 11 or so that only the tip portion 22 of the nozzle 3 can be replaced.

Further, with regard to a positional relationship between the nozzle tip surface 21 opposite to the nozzle facing surface 10 and the nozzle facing surface 10 as well as a positional relationship between the die abutting surface 25 and the nozzle abutting surface 14, it is not necessary that both of these opposing surfaces are disposed vertically if these surfaces are parallel to each other. On the other hand, if only the nozzle 3 has a configuration that satisfies above conditions, various types of the nozzle 3, such as the one to which a jacket cover for thermosetting resin is attached, can be used. Further, the nozzle 3 may be provided with a heat insulator element in the direction orthogonal to the axis of the nozzle 3 or grooves on the nozzle outer surface so as to inhibit heat conduction to the nozzle tip surface 21, or a needle valve may be attached to the nozzle 3 so as to prevent drooling.

Further describing the connection of the nozzle 3 on the stationary die 1 and the movable die 2 and the injection process, the nozzle 3 connects at the position between the side edge portion 6a of the stationary-side cavity forming surface 6 and the side edge portion 9a of the movable-side cavity forming surface 9 to perform so-called parting injection process. More specifically, as shown in FIG. 4, it is preferable that the resin injection hole 5 first abuts at the upper side (the die opening side) of the cavity C and, then, when the compression process by the movable die 2 is completed, the nozzle 3 abuts at a position where said resin injection hole 5 is narrowed or closed by the nozzle facing surface 17 of the movable die 2. In other words, a distance T1 from the bottom end portion 5a of the resin injection hole 5 to the extension line of the stationary-side cavity forming surface 6 is larger than a thickness T2 of the molded product when the compression process is completed. However, said resin injection hole 5 may alternatively be configured so that it is not closed by the nozzle facing surface 17 of the movable die 2.

In this embodiment, the injection compression apparatus is configured so that the distance between the stationary-side cavity forming surface 6 and the movable-side cavity forming surface 9 when the injection is started is 6 mm, the diameter of the resin injection hole 5 is 3 mm, the distance between the stationary-side cavity forming surface 6 and the bottom end portion 5a of the resin injection hole 5 is 3 mm, and the thickness T2 of the molded product when the compression process by the movable die 2 is completed is 2 mm. Further, the dimensions of the molded product are assumed to be 200 mm in the injection direction and 90 mm in the width direction that is orthogonal to the injection direction.

Here, in the present invention, it is to be noted that the shape of the opening of the resin injection hole 5 is not limited to the circular shape described above, but it may alternatively be configured so that a dimension in the direction parallel to the side edge portion 6a of the stationary-side cavity forming surface 6 is longer than another dimension in the direction orthogonal to said side edge portion 6a. In an example shown below, the opening was configured so that the length of the opening in the direction parallel to the side edge portion 6a of the stationary-side cavity forming surface 6 was 15 mm and the length of the opening in the direction orthogonal to said side edge portion 6a was 1.5 mm. Then, using the nozzle 3 having the resin injection hole 5 of the flat shape as described above, said product was molded from a resin material consisting of polypropylene including filler and a molded product without warpage was obtained, in spite of the fact that such material is likely to be warped. In a tested example, when the product having said dimensions was molded from said resin material using the nozzle 3 having the resin injection hole 5 of circular shape, the warpage of 13 mm, on average, occurred, but when the nozzle 3 having the resin injection hole 5 of said flat shape was used, the warpage could be reduced to 0 mm–2 mm. The shape and the ratio between longitudinal and transverse dimensions in the resin injection hole 5 may differ depending on the shape of the cavity C and used resin material, but it is desirable that a length of the resin injection hole 5 in the direction parallel to the side edge portion 6a of the stationary-side cavity forming surface 6 is 3 to 15 times larger than another length in the direction orthogonal to said side edge portion 6a. Further, the resin injection hole 5 of the flat shape may be either rectangular, rounded rectangular or elliptical. Then, the nozzle 3 having said resin injection hole 5 is removably attached to the injection device 4 so that it can be replaced with an optimal nozzle 3.

In the above description of this embodiment, though an injection compression apparatus that is provided with the stationary die 1 and the movable die 2 acting as the lower die and the upper die, respectively, and the nozzle 3 and the injection device 4 in the horizontal direction, has been described, the injection compression apparatus may alternatively be configured to be provided with the stationary die 1 and the movable die 2 in the horizontal direction and the nozzle 3 and the injection device 4 in the vertical direction. Further, the present invention may be applied to a rotary type molding machine in which a plurality of the stationary dies 1 and a plurality of the movable dies 2 are respectively provided.

Next, a procedure of an injection compression molding method using the injection compression molding apparatus according to the present invention will be described.

After preparation processes in which the dies are attached, the injection device 4 is moved, and so on, are performed, first, as shown in FIG. 5, the positioning of the tip portion 22 of the nozzle 3 with respect to the smaller-diameter portion 13 of the nozzle insertion hole 11 in the stationary die 1 is performed. At this time, as the smaller-diameter portion 13 is disposed in the deep inside of the nozzle insertion hole 11 and therefore it is difficult to perform the positioning with respect to the tip portion 22 visually, a guide ring 28 acting as a nozzle position guide means is attached on the inner circumference at the side of the injection device 4 of the larger-diameter portion 12 of the nozzle insertion hole 11. Said guide ring 28 is configured so that its inner circumference 28a has a diameter slightly larger than the outer circumference 27a of the flange portion 27 of the nozzle 3, when the nozzle 3 is inserted into the nozzle insertion hole 11, the inner circumference 28a of the guide ring 28 can be engaged with the outer circumference 27a of the flange portion 27 of the nozzle 3 before the tip portion 22 is inserted through the smaller-diameter portion 13 of the nozzle insertion hole 11. Further, the guide ring 28 is made of relatively soft metal such as gun metal so as to mitigate damage to the nozzle 3 if the nozzle 3 collides against the guide ring 28 accidentally. Then, after the nozzle 3 is inserted through said guide ring 28, the positioning of the nozzle 3 is performed by adjusting the position of the inserted nozzle 3 so that the outer circumference 27a of the flange portion 27 is inserted with respect to the inner circumference 28a of the guide ring 28. After the position of the nozzle 3 is determined, the position (as well as the direction) of the injection device 4 is fixed and then the nozzle 3 is moved backward. After the positioning process of the nozzle 3 is completed, the guide ring 28 is removed from the nozzle insertion hole 11. Thus, the nozzle positioning process is performed through the procedure described above.

Further, the distance between the nozzle tip surface 21 and the nozzle facing surface 10 is adjusted by attaching the shims 26 on the die abutting surface 25 of the nozzle 3. More specifically, after the movable die 2 is moved upward, while the nozzle 3 is inserted into the nozzle insertion hole 11, the distance between the nozzle tip surface 21 and the nozzle facing surface 10 is adjusted by changing the number or thickness of the shims 26. Here, when the position of the nozzle 3 is adjusted with respect to the stationary die 1 as described above, it goes without saying that thermal expansion of the stationary die 1 and the nozzle 3 must be taken into account.

In the molding process, the movable die 2 is moved toward the stationary die 1 by a die opening/closing means (not shown), the core portion 7 of the movable die 2 is inserted into the outer wall portion 8 of the stationary die 1, and the distance between the stationary-side cavity forming surface 6 and the movable-side cavity forming surface 9 is adjusted so that the injection process of the melted resin can be started. At this time, the movable die 2 is positioned so that a cavity volume larger than the molded product volume is reserved.

Then, the injection device 4 in which the measurement process has been completed is advanced so that the nozzle 3 is inserted into the nozzle insertion hole 11 and the resin injection hole 5 of the nozzle 3 is connected directly to the side of the cavity C that is formed between the stationary die 1 and the movable die 2. At this time, the die abutting surface 25 of the nozzle 3 abuts on the nozzle abutting surface 14 of the stationary die 1 so that the whole of the nozzle touch force F is received on said abutting surface.

Alternatively, at this time, a portion of the nozzle touch force F may be received at an abutting interface between the nozzle facing surface 10 and the nozzle tip surface 21, or the nozzle touch force F may be received, at an abutting interface, for example, between the injection device 4 and the stationary die 1, or at other abutting interfaces such as, for example, between the nozzle 3 and the bed. Further, a portion of the melted resin may get into the clearance between the nozzle facing surfaces 10, 17 and the nozzle tip surface 21 to be solidified and a portion of the nozzle touch force F may be received via said solidified resin.

Then, the screw 19 of the injection device 4 is advanced and the melted resin is injected from the resin injection hole 5 of the nozzle 3 abutting on the nozzle abutting surface 14 into the cavity C directly not through the sprue. The amount of the melted resin injected into the cavity C is determined so that it is less than the volume of the cavity C and the injection pressure is determined to be low. Therefore, the pressure of the melted resin is low in the cavity C and in a space between the nozzle facing surfaces 10, 17 and the nozzle tip surface 21. Further, the temperature of the melted resin is preferably determined so that fluidity of the resin is not too high to avoid drooling. As a result, even if there is a slight clearance between the nozzle facing surfaces 10, 17 and the nozzle tip surface 21, only very small burrs of the melted resin are created.

After the injection process of the melted resin is completed, the movable die 2 is moved by a die clamping means (not shown) in the die closing direction, the injected melted resin is compressed, and the connection between the cavity C and the resin injection hole 5 of the nozzle 3 is reduced or closed by the nozzle facing surface 17 of the side wall 15 of the movable die 2 to cut the gate.

Then, after the gate has been cut, the movable die 2 is further moved in the die closing direction to compress the melted resin until it reaches a predetermined position that is necessary to obtain the molded product as shown by a chain double-dashed line in FIG. 4, where the movable die 2 is stopped. Alternatively, the movable die 2 may be stopped when the pressure in the cavity C reaches a predetermined value. Further, the connection between the cavity C and the resin injection hole 5 may not be closed completely. In such case, the melted resin is injected continuously while the melted resin is compressed.

After the compression process of the melted resin is completed, measurement process for the next cycle is performed in the injection device 4. Then, after the measurement process is completed, the nozzle 3 is retreated from the abutting position B1 to the retreating position B2. Here, in the case where the connection between the cavity C and the resin injection hole 5 is not closed completely, the molded product in the cavity C can be separated due to the retreating movement of the nozzle 3 at this time. In order to improve the accuracy of the nozzle touch position, the retreating position B2 of the nozzle 3 may be a position where the tip portion 22 is drawn out from the smaller-diameter portion 13 of the nozzle insertion hole 11 but remains in the larger-diameter portion 12. On the other hand, at the die side, the molded product is cooled and then the movable die 2 is opened to take out the molded product and, then, the dies are prepared for the next molding cycle. Further, in order to prevent the drooling from the resin injection hole 5 of the nozzle 3, the injection device 4 may be configured so that the injection is performed without reserving a cushion volume and a suck back process is performed by moving the screw 19 back after the measurement or after the injection.

Further, it is to be noted that either thermoplastic or thermosetting resin may be used in the present invention. Further, the present invention is preferably used for molding large flat articles having large projected areas, but the articles may have both thick and thin portions or both projections and depressions. Any type of molded products may be produced by using the present invention but, as an example, the present invention may be used for producing separators for fuel cells, light guide plates and the like. Further, the present invention may be used for stick molding.

As the injection compression molding apparatus according to the present invention is configured so that the resin injection hole in the nozzle attached to the injection device is connected directly to the cavity at the position between the stationary die and the movable die wherein the cavity has a larger volume than the molded product volume, and after said injection device injects the melted resin from the resin injection hole to said cavity directly, the movable die is moved in the die closing direction so as to reduce the distance of the connection between said resin injection hole and said cavity by the side wall of the movable die, reduce the volume of the cavity and thus compress said melted resin, the construction of the dies can be simplified and loss of the resin as well as heat due to solidification of the melted resin in the path at the time of molding can be eliminated. Further, injection pressure loss can be reduced when the melted resin is injected into the cavity. Further, in the embodiment wherein the opening of the resin injection hole formed on the nozzle tip surface has a flat shape such as a rectangle, the melted resin can be injected smoothly through a narrow clearance between the stationary-side cavity forming surface and the movable-side cavity forming surface, and as a result, a good result can be achieved even when a product having a planar shape is molded from resin material including filler that has poor flowability or from polypropylene that is likely to be warped.

What is claimed is:

1. An injection compression molding apparatus comprising:
   a movable die having a movable-side cavity forming surface;
   a stationary die having a stationary-side cavity forming surface that is opposite to said movable-side cavity forming surface, and a nozzle abutting surface that is spaced from both a side edge portion of said movable-side cavity forming surface and a side edge portion of said stationary-side cavity forming surface by predetermined distances and is formed at the side of an injection device; and
   a nozzle having a resin injection hole that can be connected to the cavity directly at a position between said side edge portions of the stationary-side cavity forming surface and the movable-side cavity forming surface, a nozzle tip surface that is adjacent to said resin injection hole, and a die abutting surface that is disposed outside the nozzle nearer to the injection device than said nozzle tip surface and that can abut on said nozzle abutting surface,
   wherein melted resin is injected, from said nozzle attached to said injection device, into said cavity formed by said stationary die and said movable die, and then said movable die is moved toward said stationary die to compress said melted resin.

2. An injection compression molding apparatus according to claim 1, further comprising:
   a movable die having a core portion in which said movable-side cavity forming surface is formed; and a stationary die having an outer wall portion around said stationary-side cavity forming surface through which said core portion is inserted so that it can be movable in the die opening/closing direction, a nozzle insertion hole formed through said outer wall portion toward said stationary-side cavity forming surface, and a nozzle abutting surface formed in the vicinity of said nozzle insertion hole at the side of the injection device or inside said nozzle insertion hole.

3. An injection compression molding apparatus according to any of claims 1 or 2, wherein an opening of the resin injection hole formed on said nozzle tip surface is configured so that a dimension in the direction parallel to the side edge portion of said stationary-side cavity forming surface is longer than another dimension in the direction orthogonal to said side edge portion.

4. An injection compression molding die comprising:
   a stationary die having an outer wall portion formed around a stationary-side cavity forming surface, a nozzle insertion hole formed through said outer wall portion toward said stationary-side cavity forming surface, and a nozzle abutting surface on which the nozzle abuts and which is formed on an adjacent portion of said nozzle insertion hole at the side of the injection device or inside said nozzle insertion hole; and
   a movable die on which a movable-side cavity forming surface is formed and which has a core portion that is inserted within the outer wall portion of said stationary die to form a cavity with variable volume,
   wherein melted resin can be injected from a resin injection hole in the nozzle abutting on said nozzle abutting surface to said cavity directly, and not through a sprue, and the injected melted resin can be compressed.

5. An injection compression molding apparatus comprising:
   a pair of facing die members defining a cavity therebetween, a first said die member being fixed and a second said die member being movable toward and away from said first die member to make said cavity smaller when said second die member moves toward said first die member, and said cavity being larger when said second die member moves away from said first die member;
   compression molding means for moving said second die member toward said first die member after injection of molten plastic into said cavity;
   a cavity inlet for injection of molten plastic directly into said cavity;
   an injection nozzle having an outlet for molten resin, said outlet being adapted to closely approach said cavity inlet with no sprue therebetween; and
   a stop affixed to said first die for limiting approach of said exit of said injection nozzle to said cavity inlet.

* * * * *